(12) United States Patent
VanderPloeg et al.

(10) Patent No.: US 9,637,054 B2
(45) Date of Patent: May 2, 2017

(54) SWITCHABLE REARVIEW MIRROR ELEMENT WITH ANTI-REFLECTION MECHANISMS FOR USE WITH A DISPLAY

(71) Applicant: Gentex Corporation, Zeeland, MI (US)

(72) Inventors: John A VanderPloeg, Zeeland, MI (US); Mark A VanVuuren, Dorr, MI (US); Ethan J Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 386 days.

(21) Appl. No.: 14/180,458

(22) Filed: Feb. 14, 2014

(65) Prior Publication Data

US 2014/0268351 A1   Sep. 18, 2014

Related U.S. Application Data

(60) Provisional application No. 61/789,114, filed on Mar. 15, 2013.

(51) Int. Cl.
*G02B 5/08* (2006.01)
*G02B 17/00* (2006.01)
(Continued)

(52) U.S. Cl.
CPC ...... *B60R 1/088* (2013.01); *B60R 2001/1215* (2013.01)

(58) Field of Classification Search
CPC ........... B60R 1/12; B60R 1/088; G02B 27/01; G02B 27/0101; G02B 5/0816; G02B 27/28; G02F 1/157
(Continued)

(56) References Cited

U.S. PATENT DOCUMENTS

| 6,700,692 B2 | 3/2004 | Tonar et al. |
| 8,228,588 B2 * | 7/2012 | McCabe ............... B60R 1/12 359/265 |

(Continued)

FOREIGN PATENT DOCUMENTS

| EP | 2125431 | 3/2013 |
| KR | 2010123433 | 11/2010 |

OTHER PUBLICATIONS

Patent Cooperation Treaty, International Searching Authority, International Search Report, Written Opinion of the International Searching Authority and Notification of Transmittal, May 29, 2014 7 Pages.

(Continued)

*Primary Examiner* — Scott J Sugarman
*Assistant Examiner* — Mustak Choudhury
(74) *Attorney, Agent, or Firm* — Price Heneveld LLP; Bradley D. Johnson

(57) ABSTRACT

The embodiments described herein generally relate to a rearview mirror assembly for a vehicle. More particularly, they relate to a rearview mirror assembly including a switchable reflective element and a display. The switchable reflective element is a type that is selectively switchable between a reflective mode and a transmissive mode. The display is positioned behind the switchable reflective element for displaying images through the switchable reflective element when in the transmissive mode. The rearview mirror assembly may further include either an anti-reflection coating provided on at least one of the front and rear sides of the switchable reflective element, or first and second prisms provided on opposite sides of the switchable reflective element.

18 Claims, 2 Drawing Sheets

(51) Int. Cl.
*B60R 1/08* (2006.01)
*B60R 1/12* (2006.01)

(58) Field of Classification Search
USPC ....... 359/247, 252, 253, 265, 267, 832, 599,
359/839, 840, 850, 871, 872, 242, 245,
359/263, 275, 601–609; 428/216, 432,
428/701, 702, 913; 349/195
See application file for complete search history.

(56) References Cited

U.S. PATENT DOCUMENTS

| | | | |
|---|---|---|---|
| 8,339,526 B2* | 12/2012 | Minikey, Jr. | B60R 1/12 |
| | | | 349/11 |
| 2004/0202001 A1 | 10/2004 | Roberts et al. | |
| 2005/0134983 A1* | 6/2005 | Lynam | B60R 1/12 |
| | | | 359/872 |
| 2010/0097469 A1 | 4/2010 | Blank et al. | |
| 2011/0273659 A1 | 11/2011 | Sobecki | |

OTHER PUBLICATIONS

U.S. Patent Publication No. 2010/0277786A1, Anderson et al., Nov. 4, 2010.

* cited by examiner

SWITCHABLE REARVIEW MIRROR ELEMENT WITH ANTI-REFLECTION MECHANISMS FOR USE WITH A DISPLAY

CROSS-REFERENCE TO RELATED APPLICATION

This application claims priority to and the benefit under 35 U.S.C. §119(e) of U.S. Provisional Patent Application No. 61/789,114, filed on Mar. 15, 2013, entitled "SWITCHABLE REARVIEW MIRROR ELEMENT WITH ANTI-REFLECTION MECHANISMS FOR USE WITH A DISPLAY," the entire disclosure of which is hereby incorporated herein by reference.

BACKGROUND OF THE INVENTION

The present invention generally relates to a rearview mirror assembly for a vehicle, and more particularly to a rearview mirror assembly including a switchable rearview mirror element and a display.

SUMMARY OF THE INVENTION

According to an embodiment of the present invention, a rearview mirror assembly for a vehicle is provided comprising: a switchable reflective element that is selectively switchable between a reflective mode and a transmissive mode, wherein said switchable reflective element includes a front side and a rear side, where the front side is closer to a driver of the vehicle; a display positioned behind the rear side of said switchable reflective element for displaying images through said switchable reflective element when in the transmissive mode; and an anti-reflection coating provided on at least one of the front and rear sides of said switchable reflective element.

According to another embodiment of the present invention, a rearview mirror assembly for a vehicle is provided comprising: a switchable reflective element that is selectively switchable between a reflective mode and a transmissive mode, wherein said switchable reflective element includes a front side and a rear side; a display positioned behind the rear side of said switchable reflective element for displaying images through said switchable reflective element when in the transmissive mode; a first prism provided on at least one of the front and rear sides of said switchable reflective element; and a second prism, wherein the first and second prisms are provided on opposite sides of the switchable reflective element.

These and other features, advantages, and objects of the present invention will be further understood and appreciated by those skilled in the art by reference to the following specification, claims, and appended drawings.

DETAILED DESCRIPTION OF THE EMBODIMENTS

Figure 1:
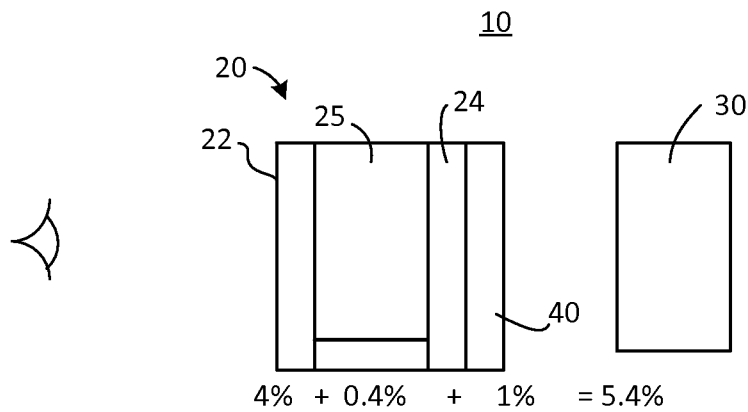
FIG. 1 is a block diagram representing components of a rearview mirror assembly constructed according to a first embodiment.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As mentioned above, the embodiments described herein generally relate to a rearview mirror assembly for a vehicle. More particularly, they relate to a rearview mirror assembly including a switchable reflective element and a display. The switchable reflective element is a type that is selectively switchable between a reflective mode and a transmissive mode. The display is positioned behind the switchable reflective element for displaying images through the switchable reflective element when in the transmissive mode. The rearview mirror assembly may further include either an anti-reflection coating provided on at least one of the front and rear sides of the switchable reflective element, or first and second prisms provided on opposite sides of the switchable reflective element.

FIG. 1 shows some of the components of a rearview mirror assembly 10 constructed according to a first embodiment. Some of the conventional components of mirror assembly 10 are not shown as the specific construction of those missing portions of the mirror assembly are not particularly relevant to the embodiments disclosed herein.

As shown, mirror assembly 10 includes a switchable reflective element 20 and a display 30. Switchable reflective element 20 is shown as generally including a front substrate 22, a rear substrate 24, and an electro-optic medium 25 therebetween. Substrates 22 and 24 may each be coated with a transparent electrically conductive layer for applying an electrical potential across electro-optic medium 25 and may incorporate polarizers. Switchable reflective element 20 may be a switchable liquid crystal reflective element as described further below. Display 30 may be any type of display commonly used in rearview mirrors and may be a liquid crystal display (LCD). Examples of rearview mirror assemblies including suitable switchable reflective elements and displays are disclosed in commonly assigned U.S. Patent Application Publication No. US 2010/0277786 A1, the entire disclosure of which is hereby incorporated herein by reference. More particularly, display 30 may be an in-plane switching (IPS) twisted nematic (TN) thin film transistor (TFT) LCD or may be a fringe field switching (FFS) LCD such as disclosed in commonly-assigned U.S. Provisional Patent Application No. 61/788,815, entitled "DISPLAY MIRROR ASSEMBLY," filed on Mar. 15, 2013, by Ethan J. Lee et al., the entire disclosure of which is incorporated by reference.

In general, by using a switchable liquid crystal reflective element as element 20 having a reflective polarizer positioned between the element 20 and an LCD serving as display 30, switchable reflective element 20 passes a large percentage of the light from display 30 in the transmissive mode. In particular, to be in the transmissive mode, an electrical potential is provided across the liquid crystalline material in element 20. This causes the liquid crystal molecules to align with the orientation of the reflective polarizer. In this state, light having a polarity corresponding to the transmission polarity of the reflective polarizer passes through the reflective polarizer and switchable reflective element 20 with little to no attenuation. On the other hand, ambient light as well as glare light from trailing vehicles is mostly either absorbed by the liquid crystalline material or passed through the element and reflective polarizer (at least that part of the incident light having the requisite polarization). Such an arrangement is particularly advantageous in that the light from display 20 does not have to compete with reflected ambient and glare light.

In a reflective mode where the display is not active, the electric potential is removed so that the liquid crystal molecules are not aligned in any particular direction (or at least in a direction opposite the reflective polarizer) which then would not absorb ambient and glare light such that this light strikes the reflective polarizer and is at least partially reflected back from the mirror element to the eyes of the driver.

Additional details of the operation of this much of the mirror assembly may be found in the above-referenced published patent application (U.S. Patent Application Publication No. US 2010/0277786 A1).

Despite the significant advantages of the above construction in reducing reflected ambient and glare light, there remains some glare light that can reflect to the eyes of the driver and interfere with the image displayed from the display. For example, bright lights at nighttime can still be reflected to the eyes of the driver at about 6.7% when in the transmissive mode. The reflected set of headlamps may not necessarily correspond with a rearview image displayed on the display such there may appear to be two cars to the rear when only one is present.

It has been determined that of this 6.7% reflectance, about 4% is caused by reflections from the front side of front substrate 22 of switchable reflective element 20, about 2.3% comes from reflections from the air/substrate interface at the rear side of rear substrate 24, and about 0.4% comes from reflections from the rear side of front substrate 22 and the front side of rear substrate 24. Refractive index matching oil may be used between optical elements in each of the embodiments described below to reduce reflections from the interfaces of the elements and thereby reduce double imaging.

According to the first embodiment shown in FIG. 1, an antireflective coating 40 is applied to the rear side of rear substrate 24. According to modeling, this can reduce the reflection from the air/substrate interface at the rear side of rear substrate 24 from about 2.3% to about 1% yielding a total device reflection of about 5.4% in the transmissive mode. By selecting a high quality antireflective coating 40, the reflection from the air/substrate interface at the rear side of rear substrate 24 can be further reduced to about 0.5%. In this example and those that follow, the antireflective coatings utilized were Museum Glass® antireflective glass available from Tru Vue, which is a subsidiary of Apogee Enterprises, Inc., headquartered in Minneapolis, Minn.

Figure 2:
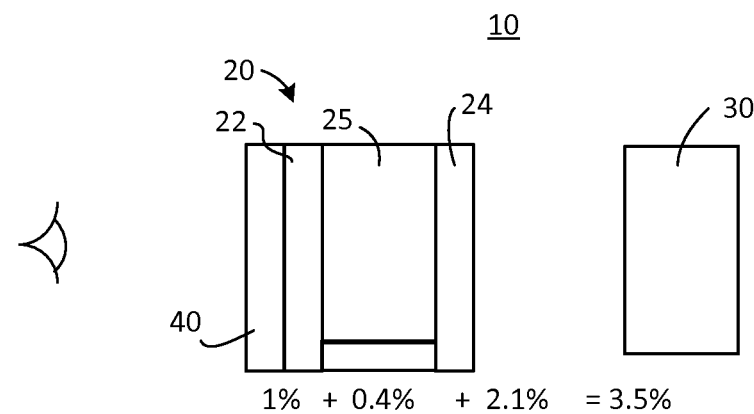
FIG. 2 is a block diagram representing components of a rearview mirror assembly constructed according to a second embodiment.

FIG. 2 shows components of a rearview mirror assembly constructed according to a second embodiment. In the second embodiment, an antireflective coating 40 is applied to the front side of front substrate 22. According to modeling, this can reduce the reflection from the front side of front substrate 22 from about 4% to about 1% while also reducing the reflection from the air/substrate interface at the rear side of rear substrate 24 from about 2.3% to about 2.11%, thereby yielding a total device reflection of about 3.5% in the transmissive mode. By selecting a high quality antireflective coating 40, the reflection from the front side of front substrate 22 can be further reduced to about 0.5%.

Figure 3:
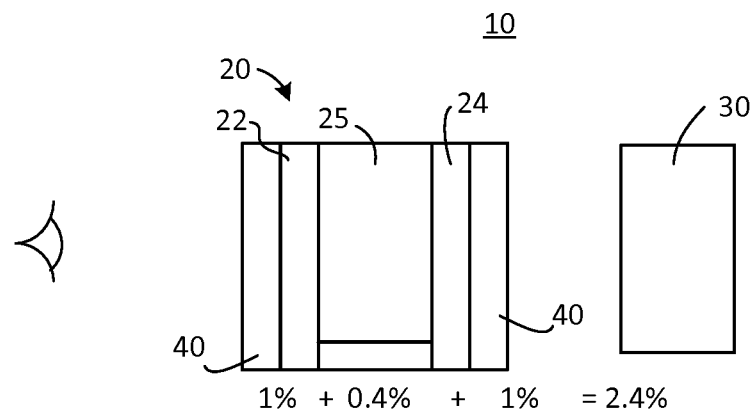
FIG. 3 is a block diagram representing components of a rearview mirror assembly constructed according to a third embodiment.

FIG. 3 shows components of a rearview mirror assembly constructed according to a third embodiment. In the third embodiment, an antireflective coating 40 is applied to both the front side of front substrate 22 and the rear side of rear substrate 24. According to modeling, this can reduce the reflection from the front side of front substrate 22 from about 4% to about 1% while also reducing the reflection from the air/substrate interface at the rear side of rear substrate 24 from about 2.3% to about 1%, thereby yielding a total device reflection of about 2.4% in the transmissive mode. By selecting a high quality antireflective coating 40, the reflections from the front side of front substrate 22 and from the air/substrate interface at the rear side of rear substrate 24 can be further reduced to about 0.5%.

Figure 4A:
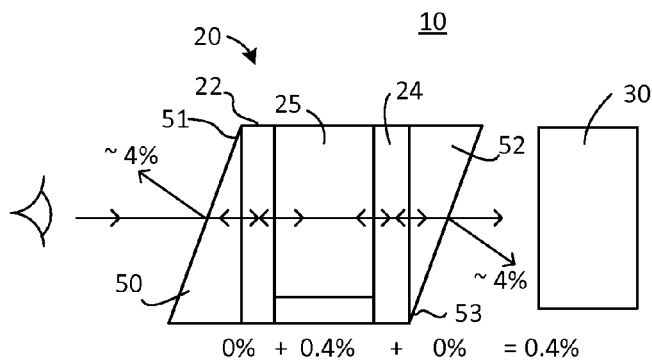
FIGS. 4A and 4B are block diagrams with ray tracings representing components of a rearview mirror assembly constructed according to a fourth embodiment.
Figure 4B:
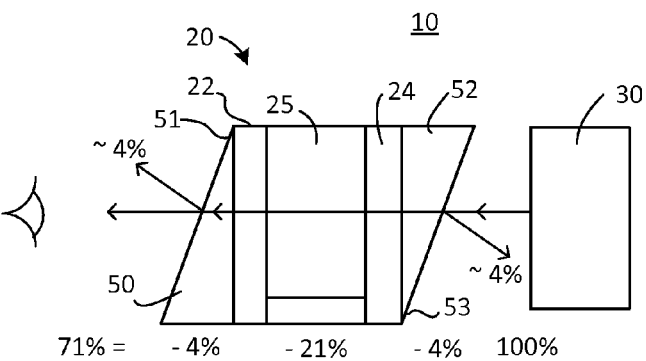

FIGS. 4A and 4B show components of a rearview mirror assembly constructed according to a fourth embodiment. In the fourth embodiment, a first prism 50 is positioned adjacent to the front side of front substrate 22 and a second prism 52 is provided at the rear side of rear substrate 24. First prism 50 has an apex 51 with an angle of about 3 to 4 degrees. First prism 50 is disposed at the front side such that apex 51 is proximate a top edge of switchable reflective element 20. Second prism 52 has an apex 53 with an angle of about 3 to 4 degrees. Second prism 52 is disposed at the rear side such that apex 53 is proximate a bottom edge of switchable reflective element 20.

According to modeling, the first and second prisms 50 and 52 arranged as shown can effectively eliminate the reflection from the front side of front substrate 22 as perceived by the driver while also effectively eliminating the perceivable reflection from the air/substrate interface at the rear side of rear substrate 24, thereby yielding a driver-perceivable total device reflection of about 0.4% in the transmissive mode. Note that the term "driver-perceivable" is used with respect to this embodiment and the following embodiment as light is still reflected, but instead is diverted away from the eyes of the driver.

FIG. 4A shows the ray tracings relative to ambient and glare light incident on the device when switchable reflective element 20 is in a transmission mode, whereas FIG. 4B shows the ray tracings relative to light from display 30 when switchable reflective element 20 is in a transmission mode. As illustrated in FIG. 4B, about 71% of the light from display 30 passes through this embodiment.

Figure 5A:
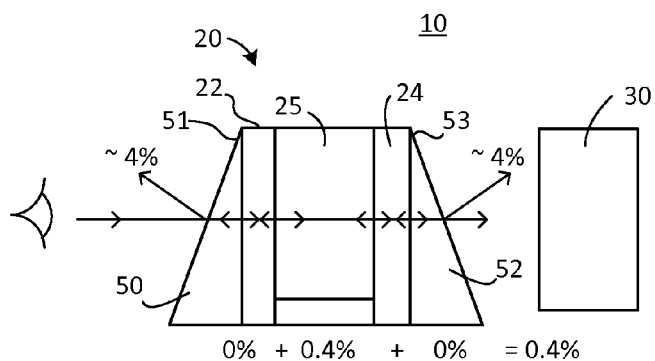
FIGS. 5A and 5B are block diagrams with ray tracings representing components of a rearview mirror assembly constructed according to a fifth embodiment.
Figure 5B:
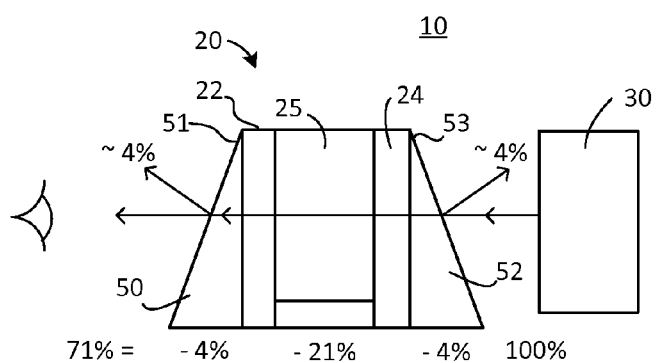

FIGS. 5A and 5B show components of a rearview mirror assembly constructed according to a fifth embodiment. In the fifth embodiment, a first prism 50 is positioned adjacent to the front side of front substrate 22 and a second prism 52 is provided at the rear side of rear substrate 24. First prism 50 has an apex 51 with an angle of at about 3 to 4 degrees. First prism 50 is disposed at the front side such that apex 51 is proximate a top edge of switchable reflective element 20. Second prism 52 has an apex 53 with an angle of at about 3 to 4 degrees. Second prism 52 is disposed at the rear side such that apex 53 is proximate the top edge of switchable reflective element 20.

According to modeling, the first and second prisms 50 and 52 arranged as shown can effectively eliminate the reflection from the front side of front substrate 22 as perceived by the driver while also effectively eliminating the perceivable reflection from the air/substrate interface at the rear side of rear substrate 24, thereby yielding a driver-perceivable total device reflection of about 0.4% in the transmissive mode.

FIG. 5A shows the ray tracings relative to ambient and glare light incident on the device when switchable reflective element 20 is in a transmission mode, whereas FIG. 5B shows the ray tracings relative to light from display 30 when switchable reflective element 20 is in a transmission mode. As illustrated in FIG. 5B, about 71% of the light from display 30 passes through this embodiment.

To further reduce unwanted reflections, an anti-reflective coating may be provided on a front surface of display 30. Such an anti-reflective coating may be a coating as disclosed in U.S. Pat. No. 6,700,692, the entire disclosure of which is incorporated by reference. Any of the other anti-reflective mechanisms may also be used that are disclosed in this patent for reducing reflections from the front of the display.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A rearview mirror assembly for a vehicle comprising:
a switchable reflective element that is a switchable liquid crystal reflective element that, in response to an electrical potential, is selectively switchable between a reflective mode and a transmissive mode, wherein said switchable reflective element includes a front side and a rear side, where the front side is closer to a driver of the vehicle;
a display positioned behind the rear side of said switchable reflective element for displaying images through said switchable reflective element when in the transmissive mode such that a large percentage of light from said display is transmitted through said switchable reflective element while ambient light and glare light are absorbed; and
an anti-reflection coating provided on at least one of the front and rear sides of said switchable reflective element,
wherein, when in the reflective mode, said switchable reflective element reflects ambient light and glare light.

2. The rearview mirror assembly of claim 1, wherein said anti-reflection coating is provided on the front side of said switchable reflective element.

3. The rearview mirror assembly of claim 1, wherein said anti-reflection coating is provided on the rear side of said switchable reflective element.

4. The rearview mirror assembly of claim 1, wherein said anti-reflection coating is provided on both the front and rear sides of said switchable reflective element.

5. The rearview mirror assembly of claim 1, wherein said display is a liquid crystal display.

6. A rearview mirror assembly for a vehicle comprising:
a switchable reflective element that is selectively switchable between a reflective mode and a transmissive mode, wherein said switchable reflective element includes a front side and a rear side;
a display positioned behind the rear side of said switchable reflective element for displaying images through said switchable reflective element when in the transmissive mode;
a first prism provided on at least one of the front and rear sides of said switchable reflective element; and
a second prism, wherein said first and second prisms are provided on opposite sides of said switchable reflective element.

7. The rearview mirror assembly of claim 6, wherein said first prism has an apex and wherein said first prism is disposed on the front side such that the apex of said first prism is proximate a top edge of said switchable reflective element.

8. The rearview mirror assembly of claim 7, wherein said second prism has an apex and wherein said second prism is disposed on the rear side such that the apex of said second prism is proximate a top edge of said switchable reflective element.

9. The rearview mirror assembly of claim 7, wherein said second prism has an apex and wherein said second prism is disposed on the rear side such that the apex of said second prism is proximate a bottom edge of said switchable reflective element.

10. The rearview mirror assembly of claim 7, wherein said switchable reflective element is a switchable liquid crystal reflective element.

11. The rearview mirror assembly of claim 10, wherein said display is a liquid crystal display.

12. The rearview mirror assembly of claim 6, wherein said second prism has an apex and wherein said second prism is disposed on the rear side such that the apex of said second prism is proximate a top edge of said switchable reflective element.

13. The rearview mirror assembly of claim 6, wherein said second prism has an apex and wherein said second prism is disposed on the rear side such that the apex of said second prism is proximate a bottom edge of said switchable reflective element.

14. The rearview mirror assembly of claim 6, wherein said switchable reflective element is a switchable liquid crystal reflective element.

15. The rearview mirror assembly of claim 14, wherein said display is a liquid crystal display.

16. The rearview mirror assembly of claim 6, wherein said display is a liquid crystal display.

17. The rearview mirror assembly of claim 6, wherein said second prism has an apex and wherein said second prism is disposed on the rear side such that the apex of said second prism is proximate one of a top edge and a bottom edge of said switchable reflective element.

18. The rearview mirror assembly of claim 6, wherein said second prism is positioned between said switchable reflective element and said display.

\* \* \* \* \*